(12) United States Patent
Acharya et al.

(10) Patent No.: US 12,710,360 B2
(45) Date of Patent: Aug. 18, 2026

(54) LIGHT RECYCLING ARTICLE FOR BIO-ASSAY

(71) Applicant: 3M INNOVATIVE PROPERTIES COMPANY, St. Paul, MN (US)

(72) Inventors: Bharat R. Acharya, Woodbury, MN (US); Raj Rajagopal, Woodbury, MN (US); Gregory W. Sitton, Minneapolis, MN (US); Benjamin G. Sonnek, Mahtomedi, MN (US); Robert M. Biegler, Woodbury, MN (US); Gilles J. Benoit, Minneapolis, MN (US); Timothy J. Lindquist, Woodbury, MN (US); John A. Wheatley, Stillwater, MN (US); Kristal L. Schutta, Forest Lake, MN (US); James A. Phipps, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 551 days.

(21) Appl. No.: 18/111,056

(22) Filed: Feb. 17, 2023

(65) Prior Publication Data

US 2023/0273119 A1 Aug. 31, 2023

Related U.S. Application Data

(60) Provisional application No. 63/314,705, filed on Feb. 28, 2022.

(51) Int. Cl.

| | |
|---|---|
| ***G01N 21/31*** | (2006.01) |
| ***G01N 21/03*** | (2006.01) |
| ***G01N 21/64*** | (2006.01) |

(52) U.S. Cl.

CPC ....... *G01N 21/314* (2013.01); *G01N 21/0303* (2013.01); *G01N 2021/317* (2013.01); *G01N 21/6452* (2013.01); *G01N 2201/0453* (2013.01)

(58) Field of Classification Search

CPC ............. G01N 21/314; G01N 21/0303; G01N 2021/317; G01N 2201/0453; G01N 21/6452; G01N 2021/6482

See application file for complete search history.

(56) References Cited

U.S. PATENT DOCUMENTS

| | | |
|---|---|---|
| 5,568,316 A | 10/1996 | Schrenk et al. |
| 6,563,117 B2 | 5/2003 | Feygin |

(Continued)

FOREIGN PATENT DOCUMENTS

| | | |
|---|---|---|
| CN | 211274691 U | 8/2020 |
| JP | 2011058868 A | 3/2011 |

(Continued)

*Primary Examiner* — Tarifur R Chowdhury
*Assistant Examiner* — Joshua M Carlson
(74) *Attorney, Agent, or Firm* — Jonathan L. Tolstedt

(57) ABSTRACT

An optical well is configured to receive a test sample for examining an optical characteristic of the sample at a first wavelength in a predetermined wavelength range. The optical well includes a wall having a bottom wall portion and a sidewall portion defining a chamber for receiving the test sample, and an optical film formed into a shape so that a portion of the sidewall portion includes a first portion of the optical film, and a portion of the bottom wall portion includes a second portion of the optical film. For a normally incident light, the microlayers in each of the first and second portions have an average optical reflectance of greater than about 80% in the predetermined wavelength range. The forming results in the plurality of microlayers of the integral (Continued)

formed optical film having a thinnest portion and a thickest portion having a thickness difference of at least 30%.

13 Claims, 11 Drawing Sheets

(56) References Cited

U.S. PATENT DOCUMENTS 9,927,417 B2 3/2018 Yakovlev et al.
10,241,054 B2 3/2019 Williams et al.
10,324,009 B2 6/2019 Chou et al.
10,605,805 B2 3/2020 Chou et al.
11,099,120 B2 8/2021 Foucault et al.
2005/0089924 A1 4/2005 Ho et al.
2007/0031961 A1 2/2007 Ho et al.
2008/0245971 A1 10/2008 Wimberger-Friedl et al.
2015/0031570 A1 1/2015 Wagner et al.
2017/0038282 A1* 2/2017 Veiseh ................. G01N 21/253
2017/0182493 A1* 6/2017 Perroud ................. G02B 21/34
2017/0363545 A1* 12/2017 Halverson .......... G01N 21/6452
2018/0066300 A1 3/2018 Williams et al.
2019/0195779 A1 6/2019 Boutami et al.
2019/0302005 A1 10/2019 Foucault et al.
2020/0025686 A1 1/2020 Chou et al.
2020/0101455 A1* 4/2020 Veiseh .................. B01L 3/5085
2020/0225161 A1 7/2020 Chou et al.
2020/0319389 A1* 10/2020 Yun ...................... G02B 27/283
2024/0230517 A1* 7/2024 Rodríguez García .... B22C 7/02
2024/0410818 A1* 12/2024 Alsheimer ............. G02B 21/34

FOREIGN PATENT DOCUMENTS

WO 2006090753 A1 8/2006
WO 2017103522 A1 6/2017
WO 2023012630 A1 2/2023

* cited by examiner

| | 97.7 microns | 78.2 microns | 58.6 microns | 48.9 microns | 39.1 microns | 19.5 microns |
|---|---|---|---|---|---|---|
| | **Original** | **0.8 Original** | **0.6 Original** | **0.5 Original** | **0.4 Original** | **0.2 Original** |
| **T(400-700):** | 0.03 | 0.01 | 0.01 | 0.02 | 0.24 | 0.89 |
| **R(400-700):** | 0.97 | 0.99 | 0.99 | 0.98 | 0.76 | 0.11 |
| **Max T(400-700):** | 0.11 | 0.05 | 0.06 | 0.05 | 0.91 | 0.95 |
| **Min R(400-700):** | 0.89 | 0.95 | 0.94 | 0.95 | 0.09 | 0.05 |

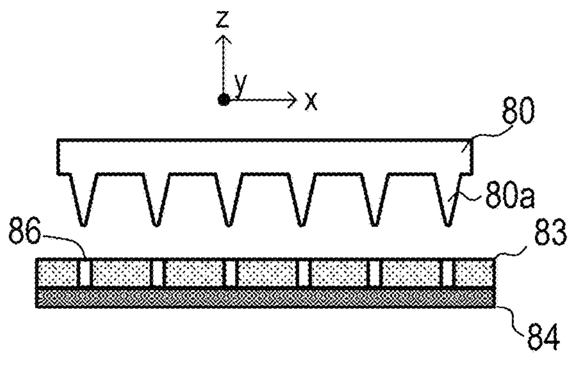
FIG. 11A
z
y
x
80
83a
80a
84a
FIG. 11B
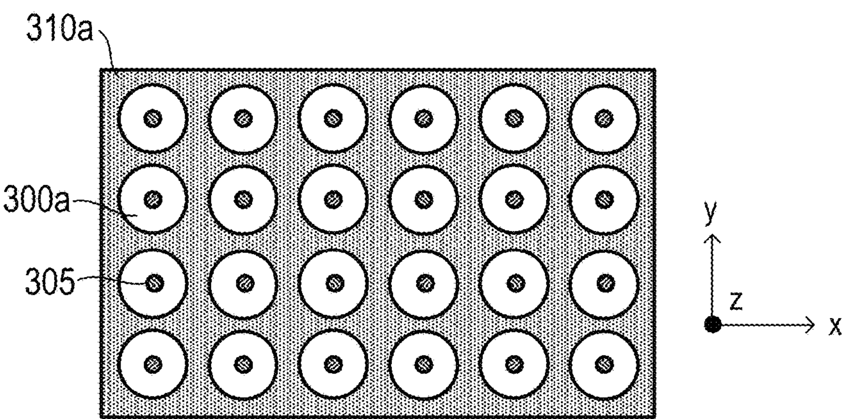
FIG. 11C

LIGHT RECYCLING ARTICLE FOR BIO-ASSAY

SUMMARY

In some aspects of the present description, an optical well is provided, the optical well configured to receive a test sample for examining at least a first optical characteristic of the test sample at at least a first wavelength in a predetermined continuous wavelength range that is at least 150 nm wide and includes at least a blue wavelength and a red wavelength. The optical well includes a wall having a bottom wall portion and a sidewall portion extending upwardly from the bottom wall, the bottom wall and the sidewall defining a chamber for receiving the test sample; and an integral and continuous formed optical film formed into a shape so that at least a portion of the sidewall portion of the optical well includes a first portion of the integral formed optical film and at least a portion of the bottom wall portion of the optical well includes a different second portion of the integral formed optical film. The integral formed optical film includes a plurality of microlayers numbering at least 10 in total, and each of the microlayers has an average thickness of less than about 500 nm. For a substantially normally incident light and for at least one polarization state, the plurality of microlayers in each of the first and second portions of the integral formed optical film has an average optical reflectance of greater than about 80% in the predetermined wavelength range. The forming results in the plurality of microlayers of the integral formed optical film having a thinnest portion and a thickest portion having a thickness difference of at least 30%.

In some aspects of the present description, an integral thermoformed multilayer optical film is provided, the optical film including a plurality of microlayers numbering at least 10 in total. The integral thermoformed multilayer optical film is thermoformed into a shape of a well and includes a bottom wall portion and a sidewall portion extending upwardly from the bottom wall. The bottom wall and the sidewall portions define a chamber configured to receive a test sample for examining at least a first optical characteristic of the test sample at at least first and second wavelengths in a predetermined continuous wavelength range that is at least 150 nm wide, and which includes at least a blue wavelength and a red wavelength. The thermoforming results in the integral thermoformed optical film having at least first and second different portions, such that for a substantially normally incident light and for at least one polarization state, the first and second portions of the integral thermoformed optical film have respective optical reflectances R1 and R2 at the first wavelength and respective optical reflectances R1' and R2' at the second wavelength, wherein R1 and R2 are within about 10% of each other and R1' and R2' are different from each other by at least 20%.

In some aspects of the present description, an optical well is provided, the optical well configured to receive a test sample for examining at least a first optical characteristic of the test sample at at least a first wavelength in a predetermined continuous wavelength range. The predetermined continuous wavelength range is at least 150 nm wide and includes at least a blue wavelength and a red wavelength. The optical well includes a wall having a bottom wall portion and a sidewall portion extending upwardly from the bottom wall, such that the bottom wall and the sidewall define a chamber for receiving the test sample, a formed optical film, and a formed backing film.

The formed optical film has a plurality of through-holes and is formed into a shape so that at least a portion of the sidewall portion of the optical well includes a first portion of the formed optical film and at least a portion of the bottom wall portion of the optical well includes one of the through-holes in the formed optical film. The formed optical film includes a plurality of microlayers numbering at least 10 in total. Each of the microlayers of the formed optical film has an average thickness of less than about 500 nm. For a substantially normally incident light and for at least one polarization state, the plurality of microlayers in each of the first and second portions of the integral formed optical film has an average optical reflectance of greater than about 80% in the predetermined wavelength range.

The formed backing film is disposed on and conforms to the formed optical film. Portions of the formed backing film cover the through-holes in the formed optical film and define the bottom wall of the optical well.

BRIEF DESCRIPTION OF THE DRAWINGS

FIGS. 11A-11C illustrate how an optical film may be formed into an article containing a plurality of optical wells, in accordance with an alternate embodiment of the present description.

DETAILED DESCRIPTION

Figure 1:
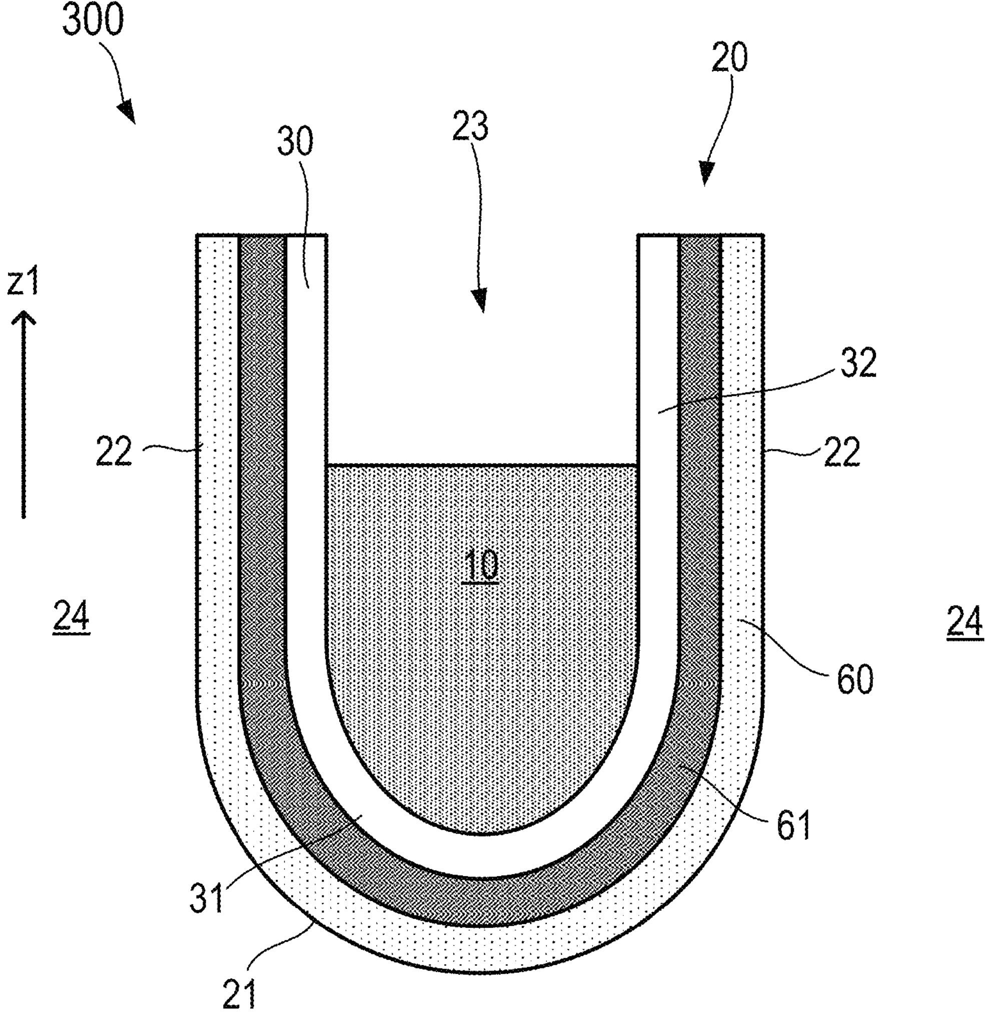
FIG. 1 is a cross-sectional side view of an optical well for receiving a test sample, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Biochemical assays for detection of target analytes typically involve three major steps, including selection and/or immobilization of receptors specifically targeted to an analyte, binding the targets to the receptors, and detection of the binding events using suitable detection methods. Each of these steps contributes to critical performance attributes (e.g., selectivity, sensitivity, detection limit, time to result, cost, etc.) of a biochemical assay that determine practical usefulness of an assay for a targeted application. While the selection of the receptor specific to the target analyte is dictated by the biochemistry of the target analyte, the binding of the target to the receptor also depends on other factors, including the affinity of the target to the receptors, the environment in which the receptors are exposed to targets, and the duration of exposure to the target analytes.

Detection of the binding event depends heavily on the efficiency of the conversion and amplification of the signal associated with the binding event into a measurable physical quantity. Typically, two methods are used in detection of the binding events. The electrical detection method relies in the change in the electrical properties of immobilized biological species upon binding of analytes and is detected by immobilizing the receptors on electrodes and measuring the change in the electrical response (e.g., conductivity, resistivity, impedance, etc.) measured of underlying electrodes on which the receptors are immobilized. The electrical response is finally amplified and analyzed.

The optical method relies on generation/or modification of properties of a light signal, sometimes of a specific wavelength, during the binding event and optical amplification of this signal to a measurable response either using photodetectors or imaging techniques. The optical method primarily relies on the measurement of change in properties (e.g., wavelength, frequency, intensity, polarization, etc.) of the light used to interrogate the sample (for colorimetric assays) or a new signal (for bioluminescent and fluorescent assays) generated during the binding events. In all of these of these optical detection methods, the sensitivity and limit of detection of a bioassay depends on utilization of all the target molecules to generate optical signal and efficient detection of optical signal generated during the binding events. In many cases the detection sensitivity depends on the selective amplification of the targeted optical signal (including wavelength and polarization). In many biological assays, the signal generation and amplification require complex and expensive instruments to achieve the desired performance attributes.

According to some aspects of the present description, light management films are used to enhance bio-assay signal detection in colorimetric and chemiluminescent assays. In some embodiments, articles (e.g., conventional consumables used for optical detection) that integrate light recycling cavities are provided, and these articles may include conventional consumables coated with optical films using processes such as thermoforming to enable light recycling within the cavities.

According to some aspects of the present description, an optical well is configured to receive a test sample for examining at least a first optical characteristic of the test sample at at least a first wavelength in a predetermined continuous wavelength range (e.g., a wavelength range extending from about 400 nm to about 750 nm) that is at least 150 nm, or 200 nm, or 250 nm, or 300 nm, or 350 nm wide and includes at least a blue wavelength and a red wavelength. In some embodiments, the predetermined continuous wavelength range may include at least one ultraviolet wavelength (e.g., a wavelength of 400 nm). In some embodiments, the predetermined continuous wavelength range may extend from about 300 nm to about 750 nm.

In some embodiments, the optical well may include a wall comprising a bottom wall portion and a sidewall portion extending upwardly (e.g., in a z-direction) from the bottom wall. In some embodiments, the bottom wall and the sidewall may define a chamber for receiving the test sample.

In some embodiments, the optical well may further include an integral and continuous formed optical film formed into a shape so that at least a portion of the sidewall portion of the optical well includes a first portion of the integral formed optical film, and at least a portion of the bottom wall portion of the optical well includes a different, second portion of the integral formed optical film. In some embodiments, the integral and continuous formed optical film may be an integral and continuous thermoformed optical film thermoformed into the shape. In some embodiments, the integral and continuous formed optical film may be formed by one or more of compression molding, thermoforming, vacuum forming, pressure forming, blow molding, embossing, and insert molding.

In some embodiments, the integral formed optical film may include a plurality of microlayers numbering at least 10, or at least 20, or at least 30, or at least 40, or at least 50, or at least 100, or at least 150, or at least 200, or at least 250 in total. In some embodiments, each of the microlayers may have an average thickness of less than about 500 nm, or 450 nm, or 400 nm, or 350 nm, or 300 nm, or 250 nm, or 200 nm, or 150 nm, or 100 nm, or 50 nm. In some embodiments, for a substantially normally incident light and for at least one polarization state (e.g., a polarization state aligned to the x-axis or y-axis of the optical film), the plurality of microlayers in each of the first and second portions of the integral formed optical film may have an average optical reflectance of greater than about 80%, or 85%, or 90%, or 95%, or 96%, or 97% in the predetermined wavelength range.

In some embodiments, the plurality of microlayers in each of the first and second portions of the integral formed optical film have a minimum optical reflectance of greater than about 70%, or 75%, or 80%, or 85% in the predetermined wavelength range. In some embodiments, for the at least one polarization state and for incident angles of at least up to 30, degrees or 35 degrees, or 40 degrees, or 45 degrees, or 50 degrees, or 55 degrees, or 60 degrees, or 65 degrees, or 70 degrees, the plurality of microlayers in each of the first and second portions of the integral formed optical film may have an average optical reflectance of greater than about 80%, or 85%, or 90%, or 95%, or 96%, or 97% in the predetermined wavelength range.

In some embodiments, the forming results in the plurality of microlayers of the integral formed optical film having a thinnest portion and a thickest portion, with a thickness difference between the thinnest portion and thickets portion of at least 30%, or 35%, or 40%, or 45%, or 50%.

In some embodiments, the first optical characteristic of the test sample at the first wavelength may include an optical absorption of the test sample at the at the first wavelength (e.g., when the first wavelength is a blue wavelength). In some embodiments, the first optical characteristic of the test sample at first wavelength may include a light emission by the test sample at the first wavelength (e.g., when the first wavelength is a red wavelength). In some embodiments, the first optical characteristic of the test sample at the first wavelength may include a light emission by the test sample at the first wavelength (e.g., when the first wavelength is a red wavelength) when the test sample is illuminated with light having a wavelength (e.g., a blue wavelength) less than the first wavelength.

In some embodiments, the optical well may further include a protective layer disposed on an exterior side of the optical well opposite the chamber (i.e., the chamber is defined on the inside of the well, the protective layer on the outer side). In some embodiments, the protective layer may substantially conform to and be bonded to the formed optical film via a separate bonding layer.

According to some aspects of the present description, an article (e.g., a plate or a tray) may include a plurality of optical wells as described herein arranged regularly in rows and columns of the optical wells. In some embodiments, the article may include at least 4, or 8, or 24, or 48, or 96, or 1048, or any appropriate number of optical wells.

According to some aspects of the present description, an optical system may include an article as described above, a plurality of light sources, a test sample disposed in each of at least some of the optical wells of the article, and a plurality of detectors. In such embodiments, the plurality of light sources may be configured to emit first lights having the first wavelength into the optical wells, and the plurality of detectors may be configured to detect at least the emitted first lights.

According to some aspects of the present description, an integral thermoformed multilayer optical film includes a plurality of microlayers numbering at least 10, or 20, or 30, or 40, or 50, or 100, or 150, or 200, or 250 in total. In some embodiments, the integral thermoformed multilayer optical film may be thermoformed into the shape of a well (e.g., an indentation or cavity). In some embodiments, the well may include a bottom wall portion and a sidewall portion extending upwardly (e.g., in the z-direction, such as a direction defining the depth of the well) from the bottom wall. In some embodiments, the bottom wall and the sidewall portions may define a chamber configured to receive a test sample for examining at least a first optical characteristic of the test sample at at least first and second wavelengths in a predetermined continuous wavelength range (e.g., a range extending from about 400 to about 750 nm). In some embodiments, the predetermined continuous wavelength range may be at least 150, nm or 200 nm, or 250 nm, or 300 nm, or 350 nm wide and may include at least a blue wavelength and a red wavelength.

In some embodiments, the thermoforming may result in the integral thermoformed optical film having at least first and second different portions. In some embodiments, for a substantially normally incident light and for at least one polarization state (e.g., a polarization state aligned with an x-axis or a y-axis of the optical film), the first and second portions of the integral thermoformed optical film may have respective optical reflectances R1 and R2 at the first wavelength and respective optical reflectances R1' and R2' at the second wavelength. In some embodiments, R1 and R2 may be within about 10%, or 9%, or 8%, or 7%, or 6%, or 5%, or 4%, or 3%, or 2%, or 1%, or 0.5% of each other. In some embodiments, R1' and R2' may be different from each other by at least 20%, or 25%, or 30%, or 35%, or 40%, or 45%, or 50%, or 55%, or 60%, or 65%, or 70%, or 75%, or 80%, or 85%, or 90%, or 95%. In some embodiments, the test sample may be configured to convert at least a portion of light having the first wavelength to a light having the second wavelength.

According to some aspects of the present description, an optical system may include a light source configured to emit a first light having the first wavelength, an integral thermoformed multilayer optical film as described above, and a test sample disposed within the chamber of the optical film. In some embodiments, the test sample is disposed in the chamber, wherein at least a portion of the first light enters a chamber of the integral thermoformed multilayer optical film through the first portion of the integral thermoformed multilayer optical film, and wherein the test sample converts at least a portion of the entered first light having the first wavelength to a second light having the second wavelength, and wherein at least a portion of the second light exits the well (i.e., chamber) of the integral thermoformed multilayer optical film through an open top of the well. In some embodiments, the optical system may further include a first optical detector configured to receive and detect at least a portion of the second light that exits the well. In some embodiments, at least at least a portion of the entered first light may exit the well through the open top of the well. In some embodiments, the optical system may further include a second optical detector configured to receive and detect at least a portion of the entered first light that exits the well.

According to some aspects of the present description, an optical well is configured to receive a test sample for examining at least a first optical characteristic of the test sample at at least a first wavelength in a predetermined continuous wavelength range. In some embodiments, the predetermined continuous wavelength range may be at least 150 nm wide and may include at least a blue wavelength and a red wavelength. In some embodiments, the optical well may include a wall having a bottom wall portion and a sidewall portion extending upwardly from the bottom wall, such that the bottom wall and the sidewall define a chamber for receiving the test sample, a formed optical film, and a formed backing film.

In some embodiments, the formed optical film may have a plurality of through-holes and the formed optical film may be formed into a shape so that at least a portion of the sidewall portion of the optical well includes a first portion of the formed optical film and at least a portion of the bottom wall portion of the optical well includes one of the through-holes in the formed optical film. In some embodiments, the formed optical film may include a plurality of microlayers numbering at least 10 in total. In some embodiments, each of the microlayers of the formed optical film may have an average thickness of less than about 500 nm. In some embodiments, for a substantially normally incident light and for at least one polarization state, the plurality of microlayers in each of the first and second portions of the integral formed optical film may have an average optical reflectance of greater than about 80% in the predetermined wavelength range. In some embodiments, the formed backing film may be disposed on and may conform to the formed optical film. In some embodiments, portions of the formed backing film may cover the through-holes in the formed optical film and define the bottom wall of the optical well. In some embodiments, the formed backing film may be diffusely reflective.

Turning now to the figures, FIG. 1 is a cross-sectional side view of an optical well for receiving a test sample, according to an embodiment of the present description. In some embodiments, optical well 300 includes a wall 20. In some embodiments, wall 20 may include a bottom wall portion 21 and a sidewall portion 22 which extends up from bottom wall 21 (e.g., in the z1 direction as shown in FIG. 1). Together the bottom wall portion 21 and sidewall portion 22 (i.e., sidewall portion 22 may extend up from all sides of bottom wall portion 21) define an interior chamber 23. In some embodiments, chamber 23 may be configured to receive a test sample 10. In some embodiments, wall 20 may include an integral and continuous formed optical film 30 formed into a shape so that at least a portion of the sidewall portion 21 of optical well 300 includes a first portion 32 of the integral formed optical film 30 and at least a portion of the bottom wall portion 21 of optical well 300 includes a different, second portion 31 of the integral formed optical film 30.

In some embodiments, optical well 300 may further include a protective layer 60 disposed on an exterior side 24 of optical well 300 opposite chamber 23. In some embodiments, protective layer 60 may substantially conform to and be bonded to the formed optical film 30 via a bonding layer 61.

As described elsewhere herein, optical well 300 may be configured to receive test sample such that test sample 10 may be examined for a first optical characteristic (e.g., an amount of absorption, an amount of emission, or other optical characteristic) at (at least) a first wavelength (e.g., a wavelength of blue light, or a wavelength of red light, or other wavelength). In some embodiments, optical film 30 may be an integral and continuous formed optical film. In some embodiments, optical film 30 may include a plurality of microlayers (see, for example, FIG. 3). In some embodiments, optical film 30 may be formed by one or more of compression molding, thermoforming, vacuum forming, pressure forming, blow molding, embossing, and insert molding. In some embodiments, the forming process may result in optical film 30 (i.e., the plurality of microlayers of the integral formed optical film 30) having a thinnest portion and a thickest portion having a thickness difference of at least 30%, or 35%, or 40%, or 45%, or 50%. For example, bottom wall portion 21 (i.e., second portion 31) of optical film 30 may be thinner (e.g., perhaps by additional stretching during the forming process) and sidewall portion 22 (i.e., first portion 32) may be thicker (i.e., thicker relative to second portion 31). As will be described elsewhere herein, the thickness of first portion 32 and second portion 31 may be configured during the forming process to configure one or more optical characteristics of optical film 30 (e.g., configure the location of a band edge corresponding to transmission of one or more wavelengths of light).

Figure 2:
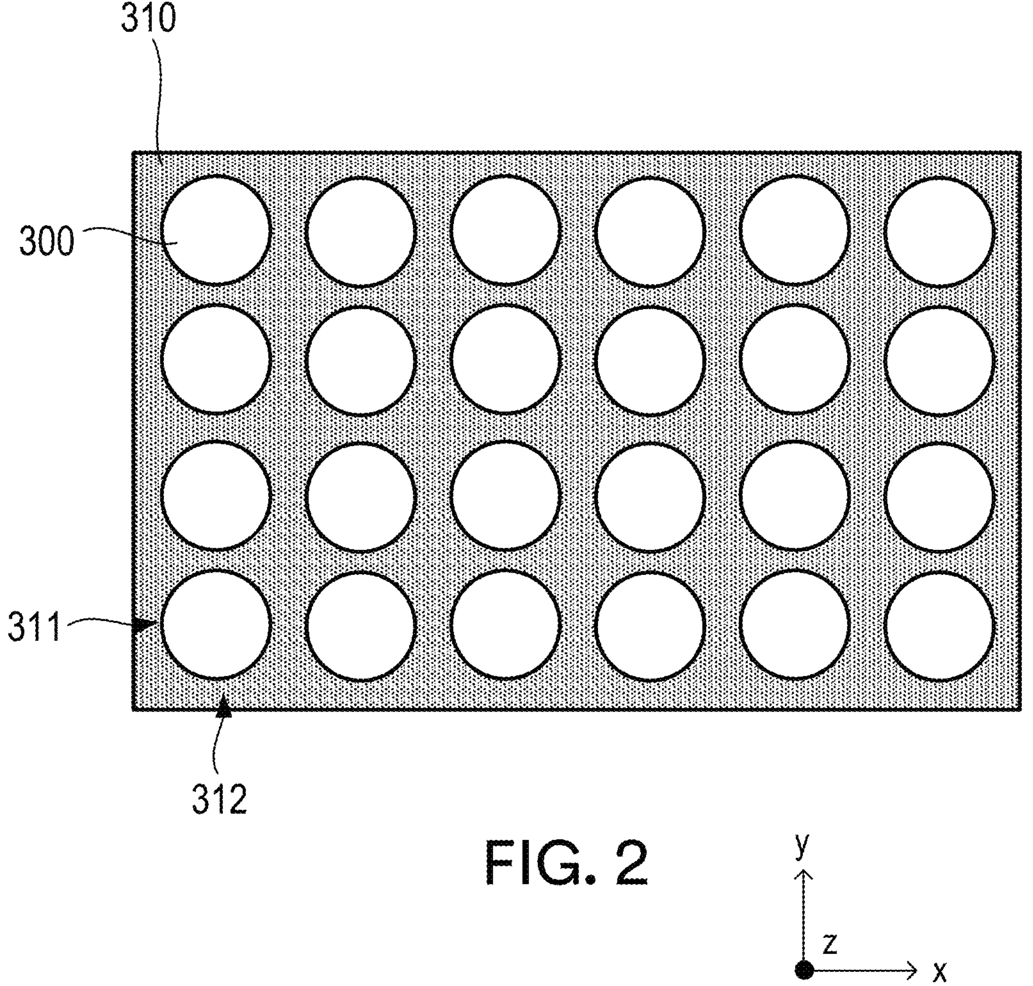
FIG. 2 is a top, plan view of an article including a plurality of optical wells for receiving test samples, in accordance with an embodiment of the present description.

FIG. 2 is a top, plan view of an article including a plurality of optical wells for receiving test samples, according to one embodiment of the present description. Article 310 may be a plate or similar structure which includes a plurality of optical wells 300 (such as optical wells 300 as shown in FIG. 1, or other embodiments thereof). In some embodiments, the plurality of optical wells 300 may arranged in a regular pattern, such as rows 311 and columns 312 of the optical wells 300. Article 310 may include any appropriate number of optical wells 300, including 1 well, 2 wells, 4 wells, 8 wells, 24 wells, 48 wells, 96 wells, or 1048 wells.

Figure 3:
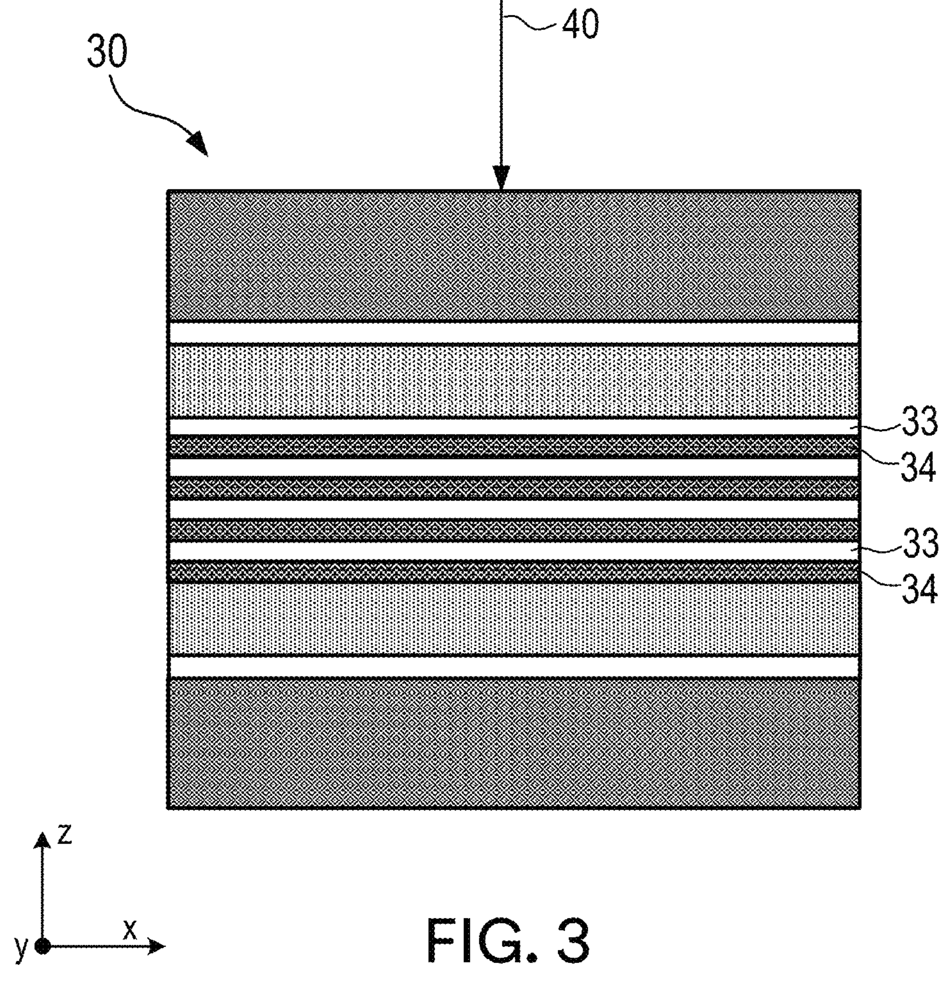
FIG. 3 is a side view showing the layered architecture of an optical film, in accordance with an embodiment of the present description.

FIG. 3 is a side view showing the layered architecture of an optical film, such as the embodiment of integral and continuous formed optical film 30 of FIG. 1. In some embodiments, the optical film 30 may include a plurality of microlayers 33, 34 numbering at least 10, or 20, or 30, or 40, or 50, or 100, or 150, or 200, or 250 in total. In some embodiments, each of the microlayers 33, 34 may have an average thickness of less than about 500 nm, or 450 nm, or 400 nm, or 350 nm, or 300 nm, or 250 nm, or 200 nm, or 150 nm, or 100 nm, or 50 nm. In some embodiments, the indices of refraction of microlayers 33, 34, and/or the total number of microlayers 33, 34, and/or the thickness profile exhibited by the plurality of microlayers 33, 34 as a whole may be configured so that a desired optical transmission/reflection profile may be created for optical film 30. Additional details on the optical characteristics of at least one embodiment optical film 30 are provided elsewhere herein. It should be noted that, in some embodiments, other layers may be present in optical film 30, including outer "skin" layers, adhesive layers, etc. Some of these layers are shown in FIG. 3 for illustration purposes, but these additional layers are not numbered, and no further explanation is provided, as the additional layers may not contribute significantly to the desired optical characteristics of optical film 30. Also, for reference, an incident light 40 is shown impinging on optical film 30 at an angle of incidence that is substantially normal to the x-y plane of optical film 30, as shown in FIG. 3. As the angle of incidence of light 40 varies (i.e., moves away from normal), the optical characteristics (e.g., the amount of optical transmission or reflection) of the optical film 30 may change relative to the angle of incidence.

Figure 4:
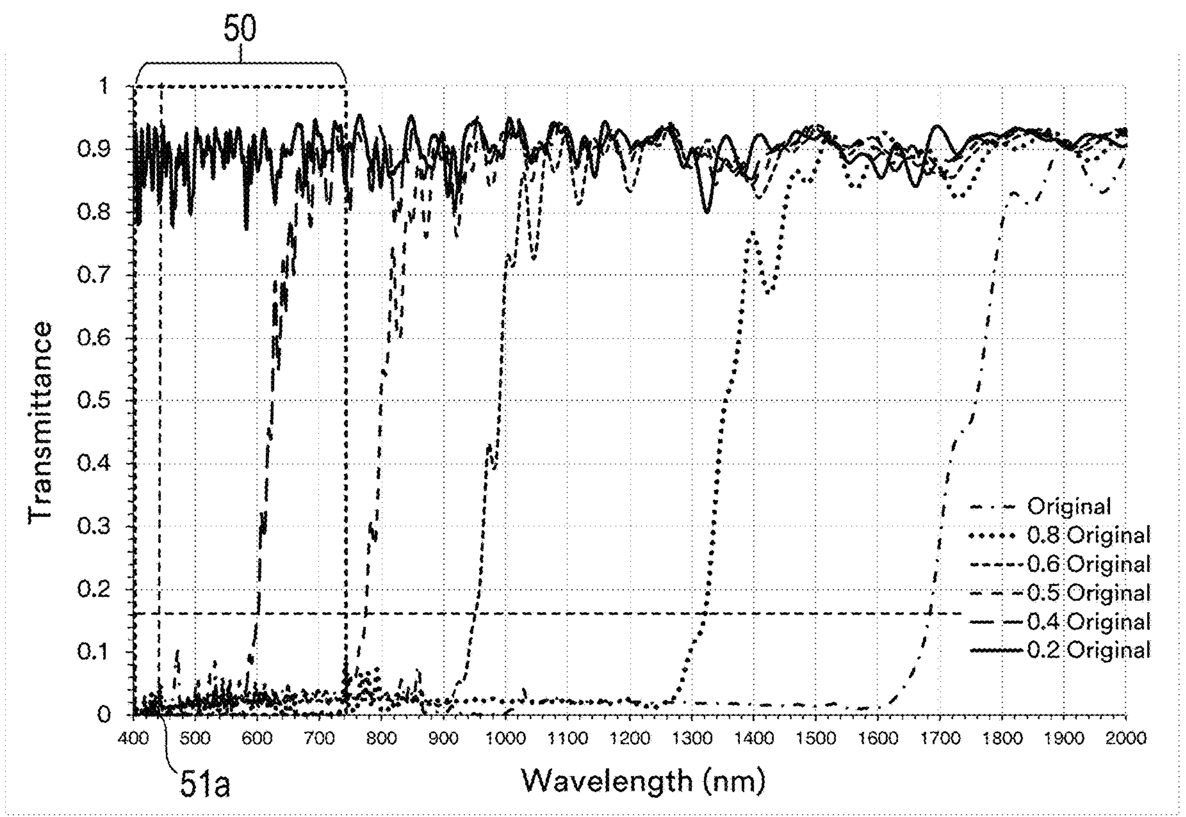
FIG. 4 is a chart showing optical characteristics of an optical film, in accordance with an embodiment of the present description.
Figures 5A, 5B:
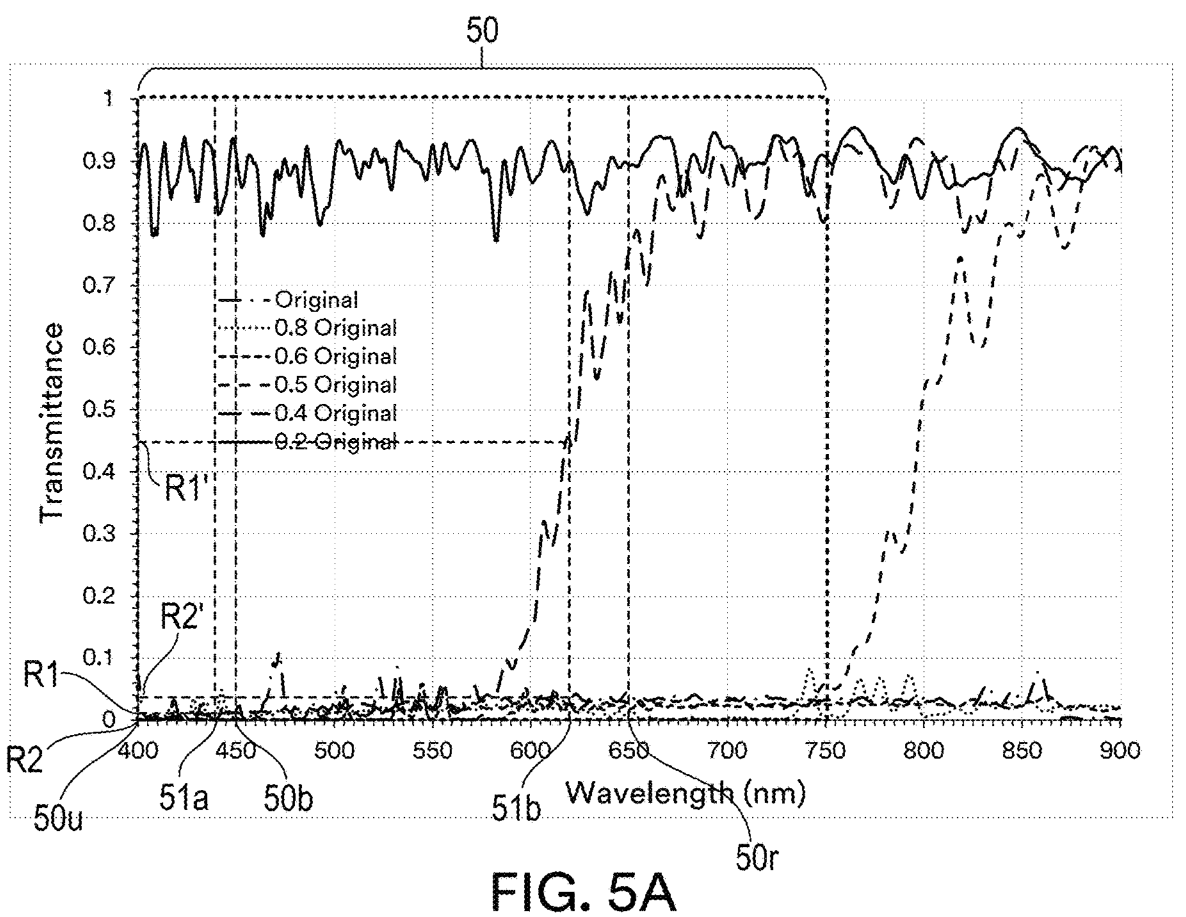
FIGS. 5A and 5B illustrate additional optical characteristics for an optical film, in accordance with an embodiment of the present description.

FIGS. 4, 5A, and 5B provide additional details on the optical characteristics that may be typical of an embodiment of an optical film, such as optical film 30 of FIG. 1. FIG. 4 shows the optical characteristics of an embodiment of optical film 30 over a wavelength range extending from about 400 nm to about 2000 nm. FIG. 5A shows the same plots but focuses on the portion of the wavelength range extending from about 400 nm to about 900 nm. FIG. 5A is a table summarizing the optical transmission and reflection characteristics for each variation (i.e., each different relative thickness or caliper) of optical film 30 over the wavelength range extending from about 400 nm to about 700 nm.

Looking at FIGS. 4 and 5A together, the optical characteristics (specifically, the amount of transmission at various wavelengths) exhibited by an optical film (such as optical film 30, FIG. 1) for a substantially normally incident light (see item 40, FIG. 3) and for at least one polarization state (e.g., light polarized to the x-axis or y-axis of the optical film) are shown.

Both FIGS. 4 and 5A illustrate a predetermined continuous wavelength range 50 which is at least 150 nm, or 200 nm, or 250 nm, or 300 nm, or 350 nm wide. In the embodiment shown in these figures, predetermined continuous wavelength range 50 extends from about 400 nm to about 750 nm, and includes at least a blue wavelength **50*b* (e.g., 450 nm) and a red wavelength 50*r* (e.g., 650 nm). In some embodiments, the predetermined continuous wavelength range may extend from about 300 nm to about 750 nm, and may include an ultraviolet wavelength 50*u***.

Both FIGS. 4 and 5A provide plotlines representing various calipers (i.e., thicknesses) of optical film, demonstrating how the optical characteristics of the optical film may be configured by changing a thickness of the optical film. For example, during a thermoforming process, at least a first part of the optical film may be stretched more than a corresponding second part of the optical film (e.g., bottom walls of the optical film as formed in the optical well may be thinner compared to side walls of the optical film).

As indicated in the legends of charts of FIGS. 4 and 5A, one plotline is shown for each variation in caliper of an optical film, including the "Original" caliper, 0.8 times the original caliper, 0.6 original, 0.5 original, 0.4 original, and 0.2 original. As demonstrated with these plotlines, a location of the band edge between substantially reflecting light (i.e., very low transmission levels) and substantially transmitting the light can be configured based on the relative thickness of the film. That is, in embodiments of an optical film producing the plotlines shown in FIGS. 4 and 5A, the location of the band edge moves to the left of the graph as the thickness decreases. In some embodiments, for example, an optical film may be configured such that, in its original, unstretched, unformed embodiment (its "original" embodiment), it exhibits a right band edge that is located deep into the infrared wavelength range, such that, after the film is stretched (e.g., stretched during a thermoforming process to create the shape of an optical well), the optical film is still at least partially reflective to visible wavelengths of light. In some embodiments, after the film is formed into optical wells, the right band edge remains to the right of the visible wavelength range, which means the formed optical wells may be highly reflective to all visible wavelengths used in a bio-assay.

Focusing now on FIG. 5A and continuous wavelength range 50, the plotline for an optical film that is "0.4 original" caliper is shown such that its right band edge (i.e., the steep increase in transmission that occurs between about 600 nm and about 650 nm) is located within continuous wavelength range 50. Wavelengths of light which may be useful in examining one or more optical characteristics of a material in an optical well may include a first, blue wavelength 51*a* and a second, red wavelength 51*b*.

In some embodiments, the first portion 31 and second portion 32 of the integral thermoformed optical film 30 (see, for example, FIG. 1) may have respective optical reflectances R1 (<2%) and R2 (<2%) at the first wavelength 51A (i.e., the blue wavelength) and respective optical reflectances R1' (about 45%) and R2' (about 3%) at the second wavelength 51*b*. In some embodiments, R1 and R2 may be within about 10%, or 9%, or 8%, or 7%, or 6%, or 5%, or 4%, or 3%, or 2%, or 1%, or 0.5% of each other. In some embodiments, R1' and R2' may be different from each other by at least 20%, or 25%, or 30%, or 35%, or 40%, or 45%, or 50%, or 55%, or 60%, or 65%, or 70%, or 75%, or 80%, or 85%, or 90%, or 95%.

The wavelength range 50 and specifically wavelength 50*b* and 50*r*, may be useful in the assay of a material (such as material 10, FIG. 1). In some embodiments, for example, the optical characteristic may be an amount of optical absorption by the test sample 10 of first wavelength 50*b* (see, for example, optical absorption 51*a*). In some embodiments, the optical characteristic may include a light emission 51*b* by test sample 10 at or near a red wavelength 50*r*. In some embodiments, the first optical characteristic of test sample 10 at the first wavelength may include a light emission by test sample 10 at a red wavelength 50*r* when the test sample is illuminated with light having a blue wavelength 50*a*, which is less than the at least the first wavelength 50*r*.

FIG. 5B summarizes the optical transmission (T) and reflectance (R) exhibited by the optical film embodiments of FIGS. 4 and 5A and provides information on the relative calipers or thickness of each film on the charts. For example, the "Original" film in this embodiment has a thickness of about 97.7 micrometers (microns), and the film labeled as "0.5 Original" has a thickness of about 48.9 micrometers (i.e., half the original thickness). The bottom two rows in the table of FIG. 5B provide the maximum and minimum values for optical transmission, T, and optical reflectance, R, across wavelength range 50. The middle two lines of the table (labeled T(400-700) and R(400-700)) represent the average transmission and reflectance values seen across the wavelength range from 400 nm to 700 nm.

Figure 6:
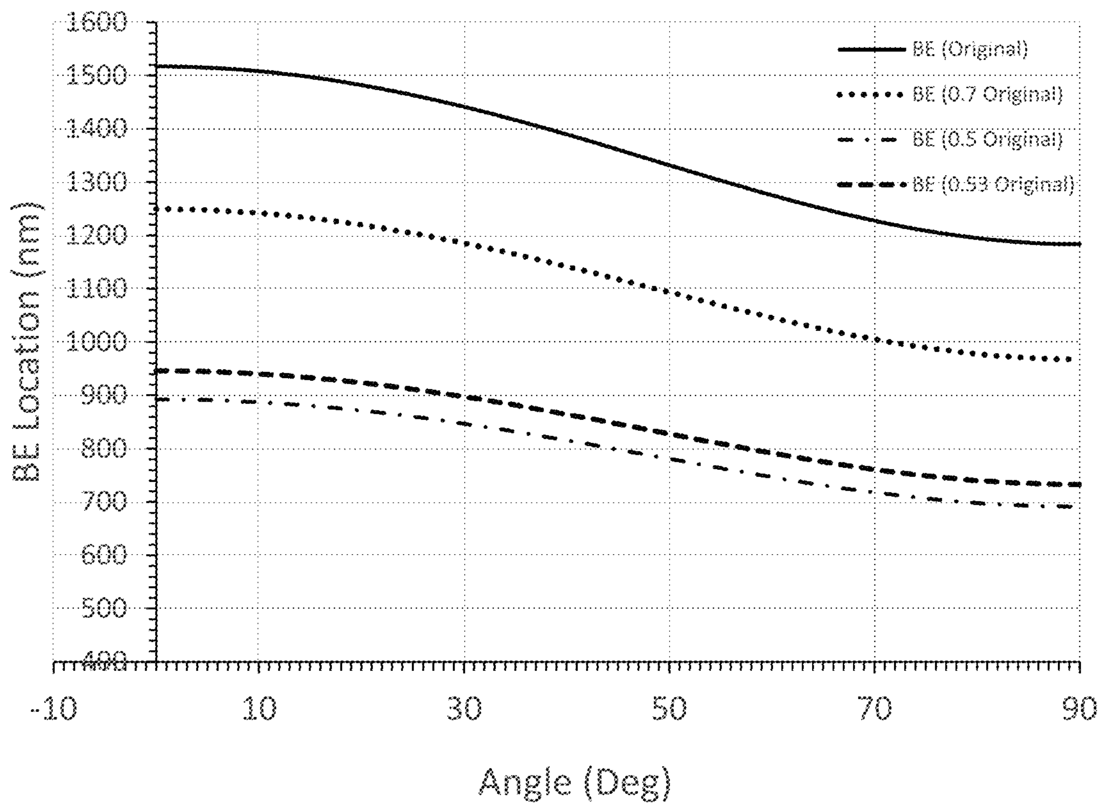
FIG. 6 is a chart showing the location of a band edge based on an incident angle of light for an optical film, in accordance with an embodiment of the present description.

FIG. 6 is a chart showing the location of a band edge based on an incident angle of light for an optical film, according to present description. For the purposes of FIG. 6, the location of the band edge is calculated as the wavelength value at which optical transmission is 50% of the maximum transmission value. Four plot lines are shown in FIG. 6, for an optical film at its original (unformed, unstretched) caliper value, for a film at 0.7 of the original caliper value, a film at 0.5 original, and a film at 0.53 original. The original, unformed film (top, solid line) demonstrates the highest wavelength values for band edge location, and these values decrease as film caliper decreases. The x-axis of the chart is the angle of incidence in degrees of light that impinges on the film. The location of the band edge shifts with the angle of incidence.

Figure 7:
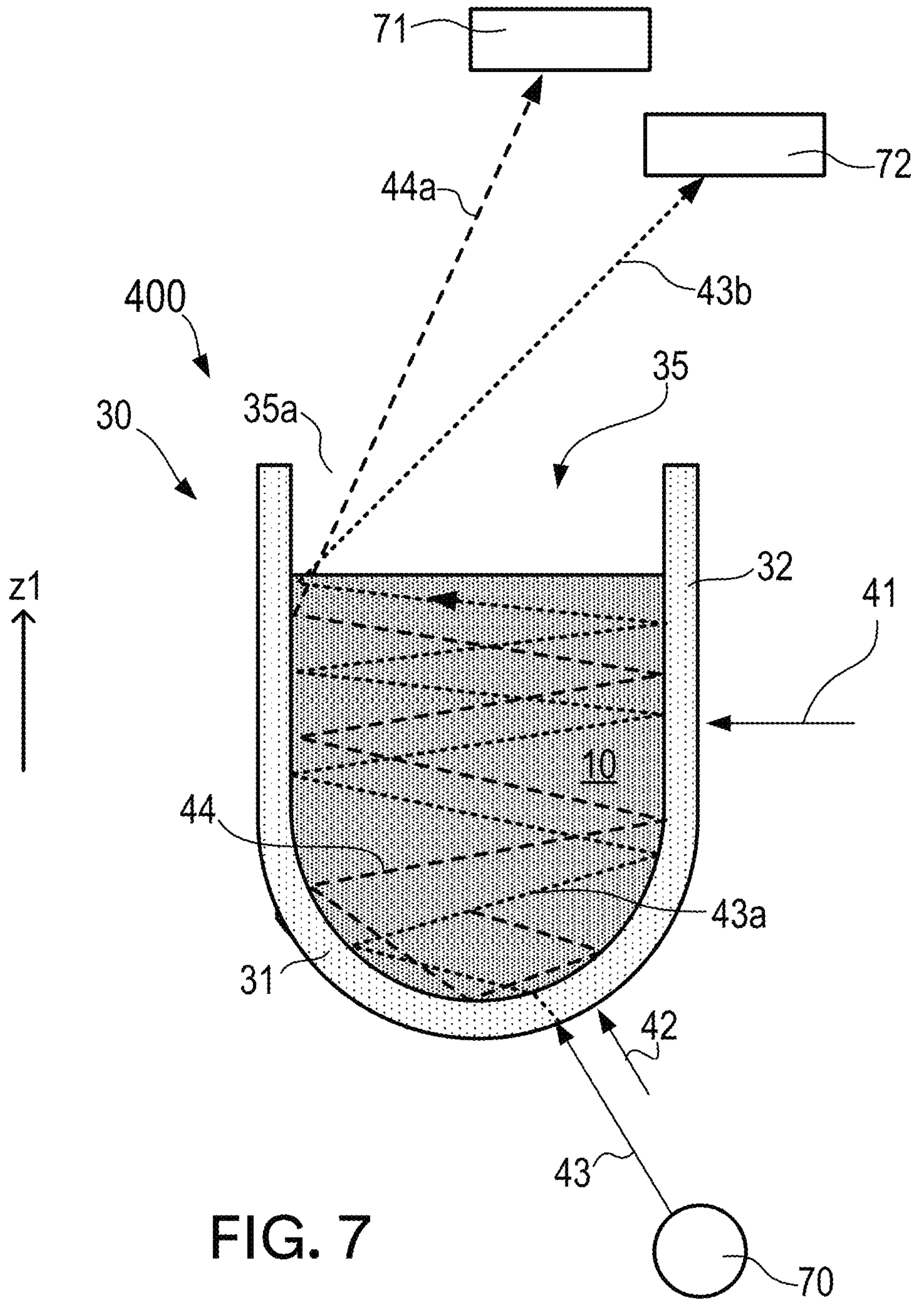
FIG. 7 is a view of an optical system having a plurality of optical wells, in accordance with an embodiment of the present description.

FIG. 7 is a view of an optical system having a plurality of optical wells, such as optical well 300 of FIG. 1. In some embodiments, optical system 400 may include an integral thermoformed multilayer optical film 30 (such as any embodiments of optical film 30 described herein), a light source 70 configured to emit at least a first light 43 into optical film 30, a first optical detector 71, and a second optical detector 72. In some embodiments, optical film 30 may be thermoformed into a shape of a well including a bottom wall portion 31 and a sidewall portion 32. In some embodiments, the sidewall portion 32 may extend upwardly (e.g., in direction z1 as shown in FIG. 7) such that the bottom wall portion 31 and sidewall portion 32 define a chamber 35. In some embodiments, chamber 35 may be configured to receive a test sample 10 for examining at least a first optical characteristic of the test sample 10 at at least first wavelength 51*a* (e.g., a blue wavelength) and a second wavelength 51*b* (e.g., a red wavelength, such as that shown in FIG. 5A) in a predetermined continuous wavelength range 50. In some embodiments, a thermoforming process may be used to create the integral thermoformed optical film 30. In some embodiments, optical film 30 may have at least a first portion 31 and a second 32 different from the first portion. In some embodiments, first portion 31 may be a different thickness than second portion 32. In some embodiments, first portion 31 may be thinner than second portion 32 (e.g., first portion may be represented by plotline "0.4 Original" as shown in FIG. 5A, and second portion 32 may be represented by plotline "Original").

In some embodiments, normally incident lights 41, 42 may impinge on optical film 30 in different respective areas of optical film 30 having different thicknesses, and optical film 30 may exhibit optical transmissions and reflectances similar to those shown for the various plotlines and thicknesses shown in FIG. 5A. In some embodiments, light source 70 may be configured to emit a first light 43 having at least first wavelength 51*a*. In some embodiments, at least a portion 43*a* of first light 43 may enter chamber 35 through first portion 31 of optical film 30.

In some embodiments, test sample 10 may be configured to convert at least a portion of first light 43 having the first wavelength 51*a* to a second light 44 having the second wavelength 51*b*. In some embodiments, at least a portion 44*a* of second light 44 may exit chamber (well) 35 through an open top 35*a* of the chamber 35. In some embodiments, first optical detector 71 may be configured to receive and detect at least a portion 44*a* of second light 44 that exits chamber 35. In some embodiments, at least at least a portion 43*b* of the entered first light 43*a* exits chamber 35 through open top 35*a* of chamber 35. In some embodiments, second optical detector 72 may be configured to receive and detect at least the portion 43*b* of the entered first light 43*a* that exits chamber 35.

Figure 8:
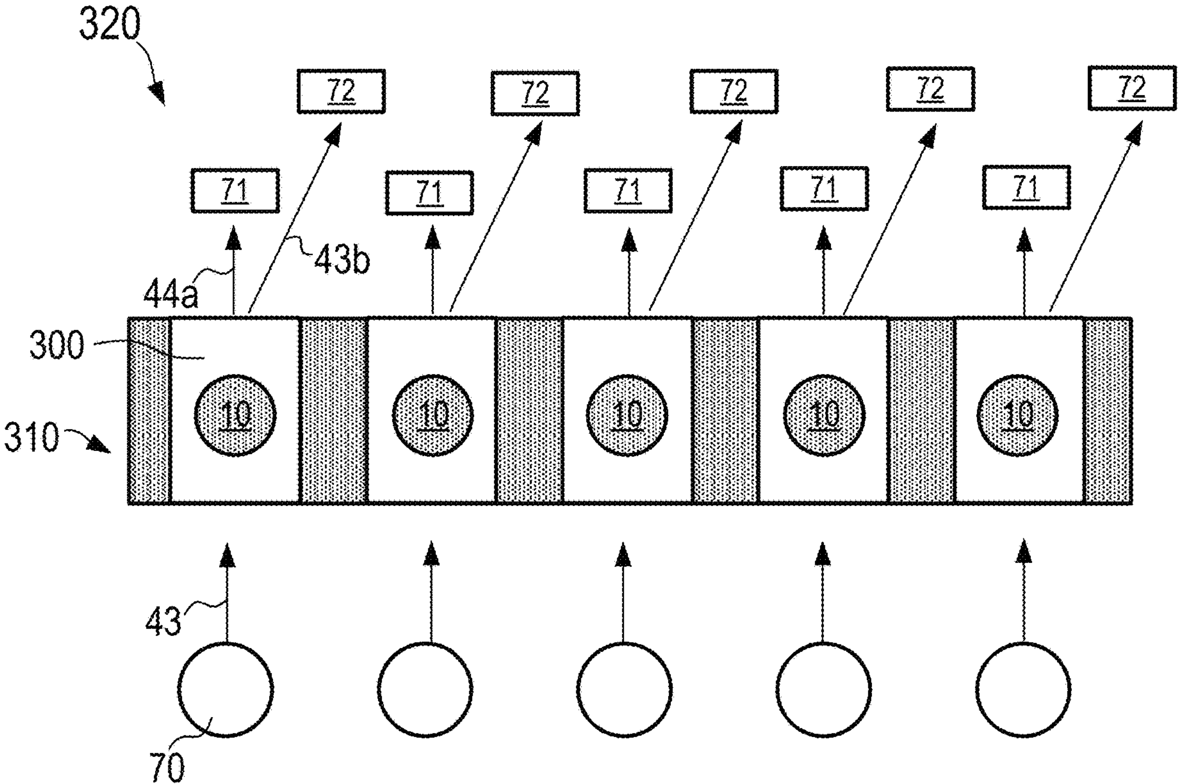
FIG. 8 is a view of an optical system showing an article having a plurality of optical wells for receiving test samples, in accordance with an embodiment of the present description.

FIG. 8 is a view of an optical system showing an article having a plurality of optical wells for receiving test samples, according to present description. In some embodiments, optical system 320 may include a plurality of light sources 70, a plurality of optical detectors 71, 72, and an article 310 (such as a plate), article 310 including a plurality of optical wells 300 (such as optical well 300 of FIG. 1). At least a subset of optical wells 300 may contain a test sample 10. Light 43 emitted by light sources 70 may enter optical wells 300 and pass into and/or through test samples 10. As discussed elsewhere herein, at least a portion of first light 43 may enter into optical wells 300. In some embodiments, a least a portion of first light 43 including first wavelength 51*a* may be converted to second light 44 including second wavelength 51*b* by test sample 10. At least a portion 44*a* of second light 44 and at least a portion 43*b* of entered first light 43*a* may exit optical wells 300. Optical detectors 71, 72 may detect portion 44*a* of second light 44 and portion 43*b* of entered first light 43*a*. The amounts of the respective portions of light received by first and second optical detectors 71 and 72 may be used to determine a characteristic of test samples 10.

Figure 9A:
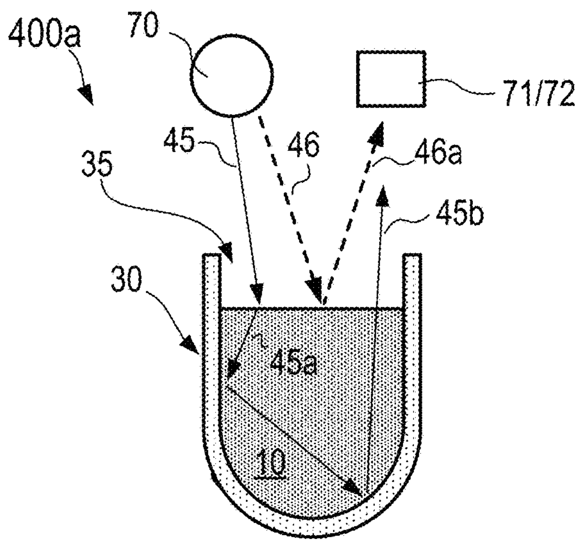
FIGS. 9A-9C show various ways in which an optical well may be used for bio-assay testing, in accordance with an embodiment of the present description.
Figure 9B:
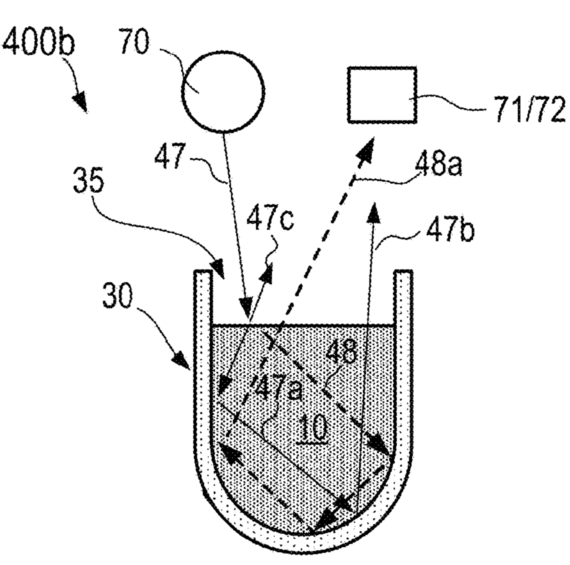
Figure 9C:
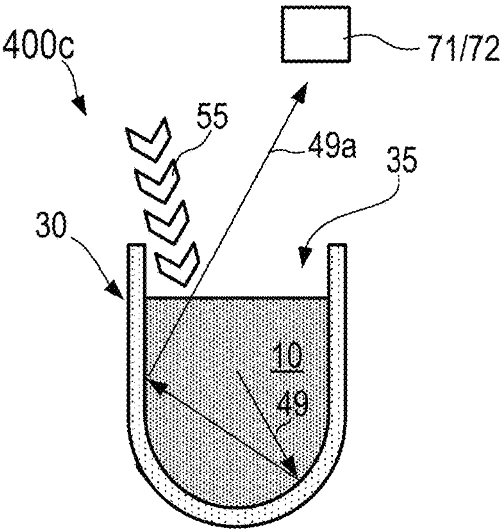

Embodiments of the optical film described herein, and the resulting formed optical wells, may be used in a variety of ways for bio-assay testing. For example, the embodiment of the optical system shown in FIG. 7 showed how light may be injected into a bottom wall portion of the optical well and how optical detectors may be used to determine the wavelengths of light that are emitted or which escape through the top opening of the optical well. FIGS. 9A-9C show various other ways in which the optical well of the present description may be used for bio-assay testing.

In the embodiment of FIG. 9A, optical system 400*a* includes an optical film 30 (formed into an optical well with a chamber 35, perhaps one of many optical wells 300 in an article such as article 310 shown in FIG. 2), at least one light source 70, and one or more optical detectors 71/72. In some embodiments, light source 70 may emit a first wavelength of light 45 and a second wavelength of light 46, both in a visible wavelength range. In some embodiments, test sample 10 (in chamber 35 of formed optical film 30) may substantially reflect light of second wavelength 46, which is reflected as reflected light 46*a* which may be detected by optical detectors 71/72. In some embodiments, light of first wavelength 45 may enter test sample 10 as entered light 45*a*. Optical film 30 may be highly reflective to entered light 45*a*. In some embodiments, at least a first portion of entered light 45*a* may be absorbed by test sample 10, and at least a second portion of entered light 45*a* may be reflected by optical film 10 and eventually exit chamber 35 as emitted light 45*b*, which may be detected by optical detectors 71/72. The results of the bio-assay may be determined, in some embodiments, by comparing the amounts of light 46*a* and 45*b* detected by optical detectors 71/72 and determining results of the assay accordingly, based on the differing amounts of wavelengths 45 and 46 that have been absorbed by test sample 10.

In the embodiment of FIG. 9B, optical system 400*b* similarly includes an optical film 30 formed to have a chamber 35, at least one light source 70, and one or more optical detectors 71/72. In this embodiment, a wavelength of light 47 is emitted by light source 70 as an excitation light. Some of light 47 may be reflected as reflected light 47*c*, and some of light 47 may enter into test sample 10 as entered light 47*a*. At least a portion of entered light 47*a* may react with test sample (e.g., exciting the sample in a process such as fluorescence) and become light 48 of a second wavelength. As optical film 30 is highly reflective to light in a visible wavelength range, entered light 47*a* may be reflected several times, allowing light 47*a* to be recycled through chamber 35, allowing more of light 47*a* to be converted to light 48. In some embodiments, a first portion of entered light 47*a* may be emitted as emitted light 47*b* (having the original wavelength of light 47) and a second portion of entered light 47*a* may be converted to light 48 (e.g., through fluorescence) and be emitted as emitted light 48*a*. Optical detectors 71/72 may detect the amounts of lights 47*c*, 47*b*, and 48*a*.

In the embodiment of FIG. 9C, optical system 400*c* includes an optical film 30 formed to include a chamber 35 containing a test sample, and one or more optical detectors 71/72. Instead of a light source 70 (not present in optical system 400*c*), a different stimulant 55 may be applied to test sample 10 (e.g., a biological stimulant, a chemical stimulant, a kinetic stimulant, a radiative stimulant, an optical stimulant, or similar stimulating agent). The stimulant 55 may cause light 49 to be emitted within test sample 10 (e.g., for example, through chemiluminescence). Light 49 is reflected off of the highly reflective walls of chamber 35 until at least a portion of light 49 is emitted as emitted light 49*a*, which may be detected by optical detectors 71/72. The amount of emitted light 49*a* may be used to determine a result of the assay test.

As described elsewhere herein, an optical film (such as optical film 30 of FIG. 1) may be formed into an article containing a plurality of optical wells by various forming processes, such as thermoforming. FIGS. 10A-10C and 11A-11C illustrate some of the ways that an optical may be formed by thermoforming.

Figure 10A:
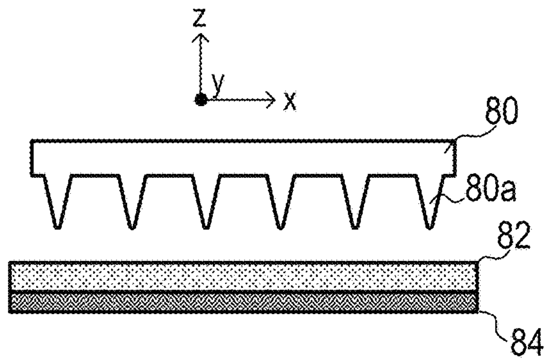
FIGS. 10A-10C illustrate how an optical film may be formed into an article containing a plurality of optical wells, in accordance with an embodiment of the present description.
Figure 10B:
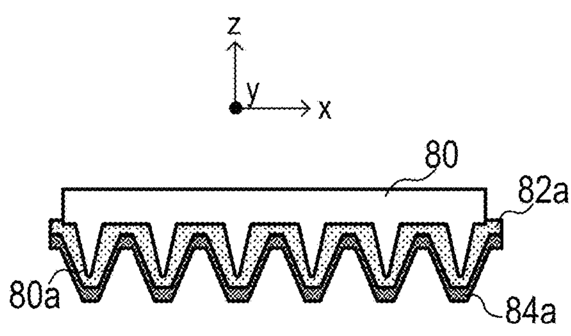
Figure 10C:
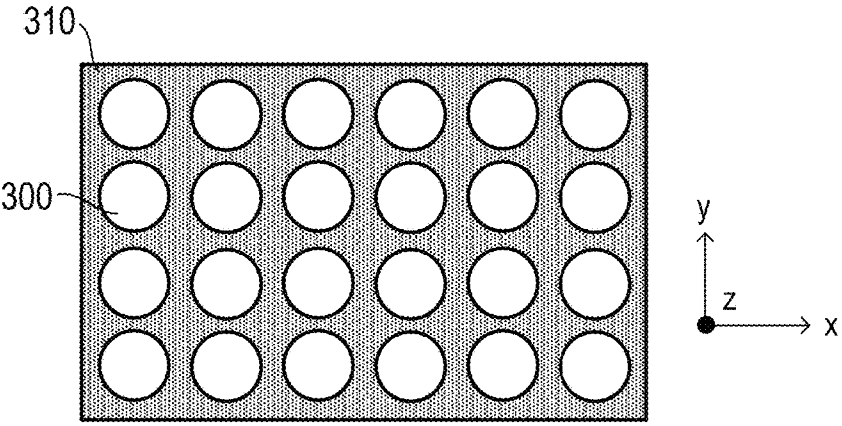

FIG. 10A shows a system including a forming tool 80 including forming features 80*a* disposed above the plane of a multilayer optical film 82. In some embodiments, optical film 82 may be disposed on a backing film 84. In FIG. 10B, forming tool 80 is lowered and pressed into optical film 82 (perhaps, in some embodiments, along with an application of heat) and the optical film 82 and backing film 80 are stretched and formed into formed optical film 82*a* and formed backing film 84*a*. As optical film 82 is a continuous piece of film in this embodiment, the forming process may stretch and/or compress the film more in some places than in others. For instance, the formed optical film 82*a* may be thinner in the places at the bottom of the wells formed as the tips of forming features 80*a* press down into optical film 80, and thicker at the sides of the wells, where the forming features 80*a* apply less direct stress. As a result, article 310 of FIG. 10C is formed, with a number of optical wells 300 formed in formed optical film 82*a*.

In the alternate method shown in FIGS. 11A-11C, optical film 83 includes through-holes 86 which, at least in some embodiments, have a one-to-one correspondence with the forming features 80*a* of forming tool 80. When the forming tool 80 is pressed into optical film 83, the forming features 80*a* optionally push into through-holes 86 and optical film 83 and backing film 84 are formed into formed optical film 83*a* and formed backing film 84*a*. In this embodiment, because of through-holes 86 into which forming features 80*a* are passed, the resulting formed optical film 83*a* has an overall thickness that is substantially uniform throughout each optical well (as optical film 83 is not stretched as much due to through-holds 86) and the optical wells 300*a* which are formed in the article 310*a* of FIG. 10C each exhibit an opening 305 in the formed optical film 83*a*. In some embodiments, formed backing film 84*a* may not have through-holes and provides a bottom side to each of the wells 300*a*. As optical film 83 is not stretched as significantly as the embodiment shown in FIGS. 10A-10C, the right band-edge of the formed optical film 83*a* will remain deep in the infrared wavelength range, and formed optical film 83*a* will remain highly reflective in the visible wavelength range. Although there is a small opening in formed optical film 83*a* at the bottom of each formed well 300*a*, the majority of the inner surface of each optical well 300*a* will be highly reflective. This method of forming article 310*a* may be preferable in some instances. In some embodiments, the backing film may be optionally reflective (e.g., a polymer film filled with TiO2 is highly diffusively reflective).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. An optical well configured to receive a test sample for examining at least a first optical characteristic of the test sample at at least a first wavelength in a predetermined continuous wavelength range that is at least 150 nm wide and comprises at least a blue wavelength and a red wavelength, the optical well comprising:

a wall comprising a bottom wall portion and a sidewall portion extending upwardly from the bottom wall portion, the bottom wall portion and the sidewall portion defining a chamber for receiving the test sample; and an integral and continuous thermoformed optical film formed into a shape so that at least a portion of the sidewall portion of the optical well comprises a first portion of the integral formed optical film and at least a portion of the bottom wall portion of the optical well comprises a different second portion of the integral formed optical film, the integral formed optical film comprising a plurality of microlayers numbering at least 10 in total, each of the microlayers having an average thickness of less than about 500 nm, such that for a normally incident light and for at least one polarization state, the plurality of microlayers in each of the first and second portions of the integral formed optical film has an average optical reflectance of greater than about 80% in the predetermined wavelength range, wherein, the forming results in the plurality of microlayers of the integral formed optical film having a thinnest portion and a thickest portion having a thickness difference of at least 30%.

2. The optical well of claim 1, wherein the at least the first optical characteristic of the test sample at the at least the first wavelength comprises an optical absorption of the test sample at the at least the first wavelength.

3. The optical well of claim 1, wherein the at least the first optical characteristic of the test sample at the at least the first wavelength comprises a light emission by the test sample at the at least the first wavelength.

4. The optical well of claim 1 further comprising a protective layer disposed on an exterior side of the optical well opposite the chamber, the protective layer conforming and bonded to the formed optical film via a bonding layer.

5. The optical well of claim 1, wherein for the substantially normally incident light and for the at least one polarization state, the plurality of microlayers in each of the first and second portions of the integral formed optical film has a minimum optical reflectance of greater than about 70% in the predetermined wavelength range.

6. The optical well of claim 1, wherein for the at least one polarization state and for incident angles of at least up to 30 degrees, the plurality of microlayers in each of the first and second portions of the integral formed optical film has an average optical reflectance of greater than about 80% in the predetermined wavelength range.

7. The optical well of claim 1, wherein the predetermined continuous wavelength range comprises at least one ultraviolet wavelength.

8. The optical well of claim 1, wherein the predetermined continuous wavelength range extends from about 300 nm to about 750 nm.

9. The optical well of claim 1, wherein the integral and continuous formed optical film is formed by one or more of compression molding, thermoforming, vacuum forming, pressure forming, blow molding, embossing, and insert molding.

10. The optical well of claim 1, wherein the at least the first optical characteristic of the test sample at the at least the first wavelength comprises a light emission by the test sample at the at least the first wavelength when the test sample is illuminated with light having a wavelength less than the at least the first wavelength.

11. An article comprising a plurality of optical wells of claim 1 arranged regularly in rows and columns of the optical wells.

12. The article of claim 11 comprising at least 4 of the optical wells.

13. An optical system comprising:

the article of claim 12;

a plurality of light sources configured to emit first lights having the first wavelength into the optical wells;

the test sample disposed in each of the optical wells; and a plurality of detectors configured to detect at least the emitted first lights.

* * * * *